Patented May 20, 1941

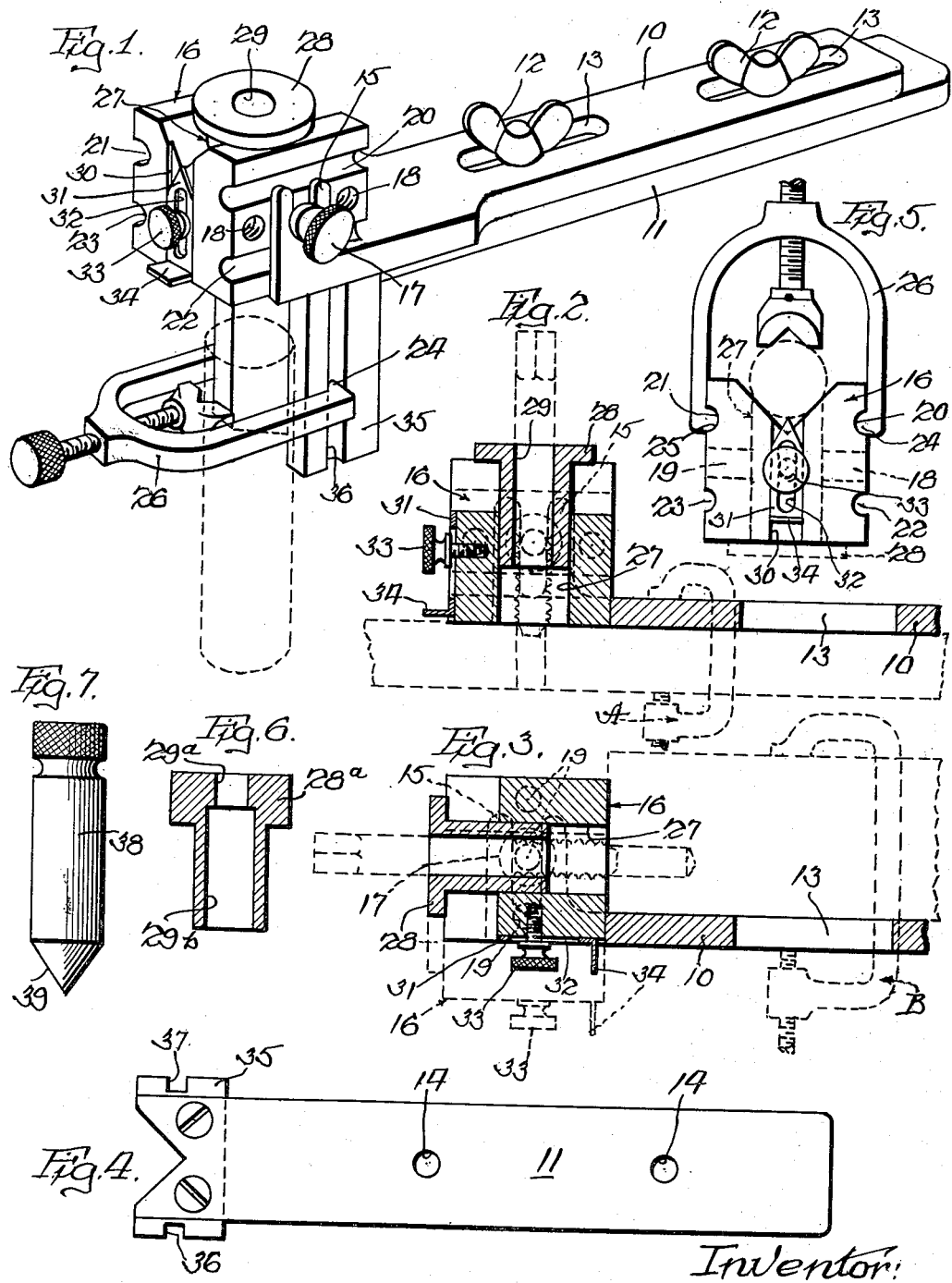

2,242,792

UNITED STATES PATENT OFFICE 2,242,792

DRILLING AND TAPPING FIXTURE

Karl Panzer, Chicago, Ill.

Application June 12, 1939, Serial No. 278,613

4 Claims. (Cl. 77—62)

This invention relates to improvements in a fixture for accurately drilling and tapping work of various shapes, and is more particularly directed to a type of fixture which may be clamped to the work or to which the work may be secured.

One object of my invention is the provision of a fixture of this character which is highly efficient in its use, and which is designed to be self-contained, so that it may be easily and readily attached to the work, or to which the work may be secured.

Various kinds of fixtures for drilling and tapping have heretofore been proposed. In many of such fixtures, the drilling and tapping is accomplished by placing the work directly beneath the fixture and clamping the same thereto. These fixtures are rather large and the bosses and obstructions on different kinds of work make it impossible to use the fixture. Also the fixtures are movable in a horizontal plane for drilling and tapping at a right-angle to the base on which the work is mounted.

My improved fixture is precision made and is for use by toolmakers, machinists, and various other types of mechanics, for work to be drilled and tapped, and is more especially for use for tapping which requires accuracy and the proper positioning of the holes in the material to be tapped, while requiring a true and exact tapping of the hole drilled. The drilling and tapping may be accomplished at the proper place with one setting of the fixture. This is accomplished by setting the fixture to the required angle or by setting the fixture to accommodate for the various kinds of work to be drilled and tapped.

The fixture is arranged to be adjusted and is separable for use with different kinds of work, and when assembled, is of very compact form, so as to be easily carried about in a toolmakers' or machinists' kit, to be readily usable to any type of work for properly drilling and tapping holes therein, or for properly tapping holes which have been previously drilled.

Further, the device is provided with a pair of V-blocks, each carried on an arm and which arms are adjustable longitudinally so as to position one V-block with respect to the other. One of the V-blocks serves as a tool guide carrier and is arranged to pivotally swing and to be bodily adjusted vertically on the upper arm, while the other of said V-blocks is secured to the lower arm and depends at a right angle therefrom to form a square therewith and this V-block also serves to guide work, such as round stock, in alignment with the tool guide carrier.

The fixture is designed to be separated to accommodate for various kinds of work, for example; when drilling and tapping flat stock, the upper arm and tool guide carrier is employed, and is secured to the work on the top or the underneath side thereof. When drilling and tapping in the end of flat stock, the tool guide carrier is pivotally swung on its arm to the desired angle and the fixture is then clamped to the work.

For aligning the fixture with holes previously drilled in stock, a plug is employed. This plug is furnished with the fixture and is of a size to slidably fit in a bored opening in the tool guide carrier. The plug is provided with a tapered end so as to locate the drilled hole, and when located, the fixture is clamped to the stock and the plug is removed. Then a tool guide is inserted in the bore to guide a tap into the drilled hole. The size of tool guide employed depends upon the size of tap used.

The tool guide carrier is also provided with an indicator that is manually adjustable thereon for aligning round stock to be drilled and tapped after a line has been scribed longitudinally thereof.

Reference being had to the following figures of the drawing, in which:

Figure 1 is a perspective view of my improved drilling and tapping fixture.

Figure 2 is a detail longitudinal sectional view of the upper portion of the fixture and V-block forming a tool guide carrier, shown clamped to a piece of work to be drilled and tapped.

Figure 3 is a longitudinal sectional view of the fixture with the tool guide carrier adjusted for drilling and tapping horizontally of the work.

Figure 4 is a top plan view of the lower portion of the fixture.

Figure 5 is a detail end view of the V-block forming a tool guide carrier and illustrating a clamp attached thereto for holding work to be drilled and tapped.

Figure 6 is a detail cross sectional view of a tool guide for use in connection with the fixture; and Figure 7 is a side elevation of a centering plug for use with the fixture.

My improved drilling and tapping fixture consists of two relatively flat arms 10 and 11, respectively, which are arranged in face to face sliding relation and secured together by means of wing bolts 12—12 that extend through elongated slots 13—13 in the upper arm 10 and are threaded into threaded openings 14—14 in the lower arm 11, (Fig. 4). The upper arm 10 is provided with a pair of integral upwardly extending bifurcated portions 15—15 on each side and at one end thereof, between which a V-block forming a tool guide carrier 16 is positioned, and which V-block or tool guide carrier is adapted to be pivotally secured to the bifurcated portions of the arm by means of thumb screws 17—17. These screws may be selectively threaded into any of the pairs of aligned threaded openings 18—19 provided on each side of the V-block or tool guide carrier 16. Parallel with and above and below these openings 18—19, the V-block 16 is provided with grooves arranged in pairs 20—21 and 22—23, which are adapted to receive the ends 24—25 of a U-shaped clamp 26 which is slidably positioned therein for holding the work, (Fig. 5). The V-block or tool guide carrier 16 is also provided with a relatively large bore 27, which is arranged to receive a tool guide 28 therein, and which tool guides are each provided with a bore 29 therein, the bores being of sizes corresponding to the drill sizes and the tap sizes desired for the work.

At one end of the V-block or tool guide carrier 16 and centrally thereof, is a parallel milled groove 30 in which an indicator 31 is slidably positioned, and which indicator is provided with an elongated slot 32 through which a thumb screw 33 extends and is threaded in the V-block. The lower portion of the indicator is formed outwardly providing a finger piece 34 for adjusting the same in the groove 30, and when adjusted, may be secured by the thumb screw 33. This indicator is especially for use in connection with round stock to be drilled and tapped along a line scribed longitudinally thereof for indicating the proper alignment of the holes to be drilled and tapped, (Fig. 5), when the same is clamped to the V-block 16 by means of the clamp 26.

The lower arm 11 of the fixture carries a V-block 35, which is provided with a longitudinally extending groove 36—37 on each side thereof and which grooves also receive the ends 24—25 of the clamp 26 therein. The clamp is slidably positioned in the grooves 36—37 of the V-block 35 for securing work below the upper arm 10 and to retain the work aligned with the V-block or tool guide carrier 16 and the tool guide 28 therein. This arm 11 may then be adjusted with respect to the upper arm 10 by releasing the wing bolts 12—12 and sliding the arm 11 longitudinally with respect to the arm 10 until the work clamped to the V-block 35 is properly positioned with respect to the tool guide in the tool guide carrier 16; then the wing bolts 12—12 are manually turned to secure the arms 11 and 10 together.

In order to insure the correct drilling and tapping of holes in work, a tool guide 28 which is preferably the size of the drill to be used, is positioned in the bore 27 of the tool guide carrier 16 to guide the drill into the work, and when drilled, the tool guide 28 is removed and a tool guide of the tap size is then inserted in the bore 27 for accurately guiding the tap into the drilled hole previously made by guiding the drill.

When a piece of flat work is to be drilled and tapped, the lower arm 11 is removed from the upper arm 10 by removing the wing bolts 12—12 and the arm 10 may then be placed directly upon the work (Fig. 2), and the drill and tap guided by a tool guide 28 in the same manner as that above described. In order to rigidly secure the fixture to the work, a C-clamp A may be employed, (Fig. 2).

It is sometimes desired to drill openings into the ends of flat stock or into the peripheries of discs, and in order to accomplish this, the tool guide carrier 16 may be bodily swung on the thumb screws 17—17 and adjusted vertically in the bifurcated portions 15—15 of arm 10 for the proper aligning and positioning of the drill and tap. To further adjust the tool guide carrier 16, any of the threaded openings 18—19 may be employed which permits of additional adjustments of the tool guide carrier. Also, the work may be clamped by means of a C-clamp B to the top surface of the arm 10 for securely retaining the fixture in position, (Fig. 3).

The removable lower arm 11 of the fixture may also be employed as a square by reason of the V-block 35 being fixedly attached to the arm at a 90 degree angle.

The standard types of taps of the present day construction range from very small to approximately one half inch, with a straight shank of approximately the same diameter as the threaded portion of the tap, but in the sizes exceeding one half inch, the shank of the tap is reduced and therefore, a slightly different type of tool guide 28a is employed, (Fig. 6). This tool guide is provided with a central bore 29a which receives the shank of the tap and an enlarged bore 29b which receives the threaded portion of the tap.

This type of fixture is especially adapted for use for the accurate drilling and tapping of holes, and when the tap is positioned in the tool guide 28 and guided to the drilled hole in the work, it will be noted that in some instances, the tap is not of sufficient length to permit of the complete tapping thereof, and therefore, when the tap is well started, it will be properly aligned and the fixture may then be removed and the tap will be accurately aligned to guide itself to complete the tapping operation.

Assume now that the fixture is to be positioned on work which has been previously drilled and is to be tapped, then prior to the securing of the fixture to the work; the tool guide 28 is removed from bore 27 of the tool guide carrier, (Fig. 7), and a plug 38 is employed. This plug 38 snugly fits the bore 27 of the tool guide carrier 16 and is provided with a conical end 39 to locate the drilled hole in the work, and when the hole is located, the plug serves to center the bore 27 of the tool guide carrier with the drilled hole. Then the fixture is clamped to the work and the centering plug 38 is removed and a tool guide 28 of the size of the tap to be used, is inserted in the bore 27 for guiding the tap.

I claim:

1. In a device of the character described, the combination of a pair of arms arranged one over the other for longitudinal adjustments with respect to each other, a member having a bore therein forming a tool guide carrier and pivoted for manual angular adjustments at one end of one of said arms, a second member fixedly secured to one end of the other of said pair of arms forming a right angle therewith, a tool guide in said tool guide carrier for directing a tool into work positioned against said second member and adjustably located by movement of one of said arms with respect to the other.

2. In a device of the character described, the combination of a pair of arms arranged one over the other for longitudinal adjustments with respect to each other, a tool guide carrier arranged for manual pivotal adjustments at one end of one of said arms, a tool guide in said tool guide carrier, a member secured to one end of the other of said pair of arms and adapted to support and align work with respect to said tool guide carrier.

3. In a device of the character described, the combination of a pair of arms arranged in overlapped relation and for longitudinal adjustments with respect to each other, a member carried at one end of each of said pair of arms, one of said members forming a tool guide carrier and being arranged for pivotal adjustments with respect to the other member, and means for locking said pivoted tool guide carrier in adjusted positions.

4. In a device of the character described, the combination of a separable pair of arms arranged in overlapped relation for longitudinal adjustments with respect to each other, a tool guide carrier pivoted at one end of one of said pair of arms and being arranged for vertical adjustments thereon, a tool guide in said tool guide carrier, a member carried by the other of said arms and movable therewith for adjustment with respect to the tool guide carrier, and means adjustably securing said arms together.

KARL PANZER.